United States Patent
Chen et al.

(10) Patent No.: US 8,856,696 B2
(45) Date of Patent: Oct. 7, 2014

(54) INTEGRATED CIRCUIT LAYOUT MODIFICATION

(75) Inventors: Wen-Hao Chen, Hsinchu (TW); Yuan-Te Hou, Hsinchu (TW); Yi-Kan Cheng, Taipei (TW)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 132 days.

(21) Appl. No.: 13/354,707

(22) Filed: Jan. 20, 2012

(65) Prior Publication Data
US 2013/0191796 A1    Jul. 25, 2013

(51) Int. Cl.
*G06F 17/50*    (2006.01)

(52) U.S. Cl.
USPC ............................................. 716/55; 716/56

(58) Field of Classification Search
CPC . G06F 17/50; G06F 17/5009; G06F 17/5022; G06F 17/5077; G06F 2217/12; G06F 17/5068; G06F 17/5081; G06F 2217/62; H01L 21/027
USPC ............................................. 716/54–56, 139
See application file for complete search history.

(56) References Cited

U.S. PATENT DOCUMENTS

| | | | |
|---|---|---|---|
| 8,007,966 B2* | 8/2011 | Lin et al. ........................... | 430/5 |
| 8,112,730 B2* | 2/2012 | Aleksanyan et al. ......... | 716/111 |
| 8,209,656 B1* | 6/2012 | Wang et al. ................... | 716/139 |
| 8,448,100 B1* | 5/2013 | Lin et al. ........................ | 716/54 |
| 2006/0036979 A1* | 2/2006 | Zurbrick et al. .................. | 716/4 |
| 2008/0244504 A1* | 10/2008 | Drapeau et al. ................. | 716/20 |
| 2009/0106716 A1* | 4/2009 | Aleksanyan et al. ............. | 716/5 |

* cited by examiner

*Primary Examiner* — Binh Tat
(74) *Attorney, Agent, or Firm* — Lowe Hauptman & Ham, LLP

(57) ABSTRACT

Methods are disclosed of modifying an integrated circuit (IC) design that utilizes multiple patterning technology (MPT). The methods include configuring a first layout of an integrated circuit, having at least one layer with features to be formed utilizing fabrication by at least two masks. The at least one layer includes a plurality of active cells and a plurality of spare cells. A second layout is configured to re-route the spare cells and active cells, wherein the re-routing utilizes at least a portion of the plurality of spare cells. Fewer than all of the at least two masks are replaced to configure the second layout.

20 Claims, 7 Drawing Sheets

INTEGRATED CIRCUIT LAYOUT MODIFICATION

BACKGROUND

As dimensions of integrated circuits are reduced, numerous challenges to manufacturing are presented. One such challenge is the patterning of features (e.g., channels, gate stacks, spacers, etc.) that are smaller than those achievable with a single mask. To achieve integrated circuit (IC) features that are closer together than currently possible with one mask, a layout is split into at least a first mask and a second mask. The first mask is used to form a first set of features defined in the layout, and the second mask is used to form a second set of features defined in the layout. This process is referred to as multiple patterning technology (MPT). MPT is used to form features on advanced technology nodes.

One drawback of MPT is the relatively high cost incurred by modifications to the layout. In some instances, designers include spare cells, or non-functional features in unused areas of the layout when designing ICs. Customers, managers, or other engineers may submit an Engineering Change Order (ECO), which is a request that the designed IC have different features, perform different functions, or be modified in some other way. When responding to an ECO, the designer can simply re-route lines or other connecting structures to the spare cell in order to make the requested change, if the spare cell fulfills the need of the ECO.

However, if a change must be made to a layer of the IC formed by MPT, the change often involves modifying two or more masks instead of a single mask. The modification of additional masks presents a higher level of difficulty and increases production time and costs in comparison with modifications to a single mask.

BRIEF DESCRIPTION OF THE DRAWINGS

One or more embodiments are illustrated by way of example, and not by limitation, in the figures of the accompanying drawings, wherein, wherever possible, elements having the same reference numeral designations represent like elements throughout. The accompanying drawings are incorporated herein and are part of this disclosure.

DETAILED DESCRIPTION

The following disclosure provides many different embodiments, or examples, for implementing different features described below. Specific examples of components and arrangements are described below to simplify the present disclosure. These are, of course, examples and are not intended to be limiting. For example, various features may be arbitrarily drawn in different scales for simplicity and clarity.

When designing integrated circuits (ICs), substrates have features formed thereon to implement circuits, some of which are formed by patterning a substrate. In one method, a mask is used to deposit material in at least a portion of an unmasked area of the substrate, such as through chemical vapor deposition, physical vapor deposition, or other suitable process. Another method involves depositing a film and using a mask to cure the film by photolithographic exposure, then removing the uncured portions of the film and an underlying portion of the substrate by etching. Still another method may combine the two processes.

Figure 1A:
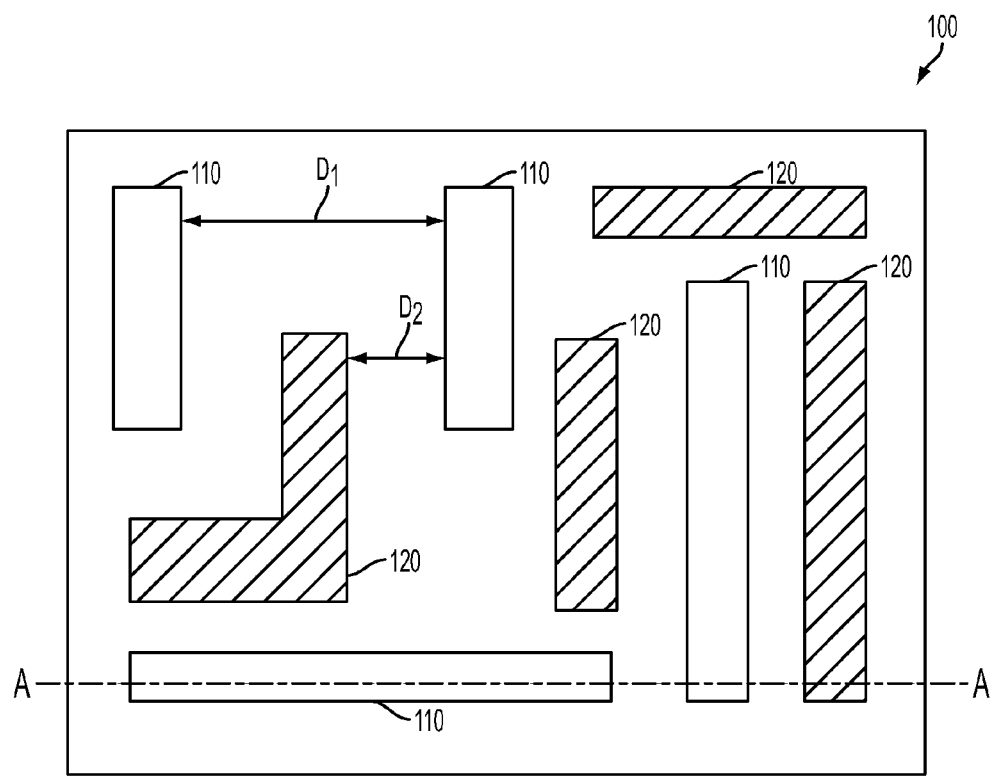
FIG. 1A is a layout of one layer of an integrated circuit according to one or more embodiments.
Figure 1B:
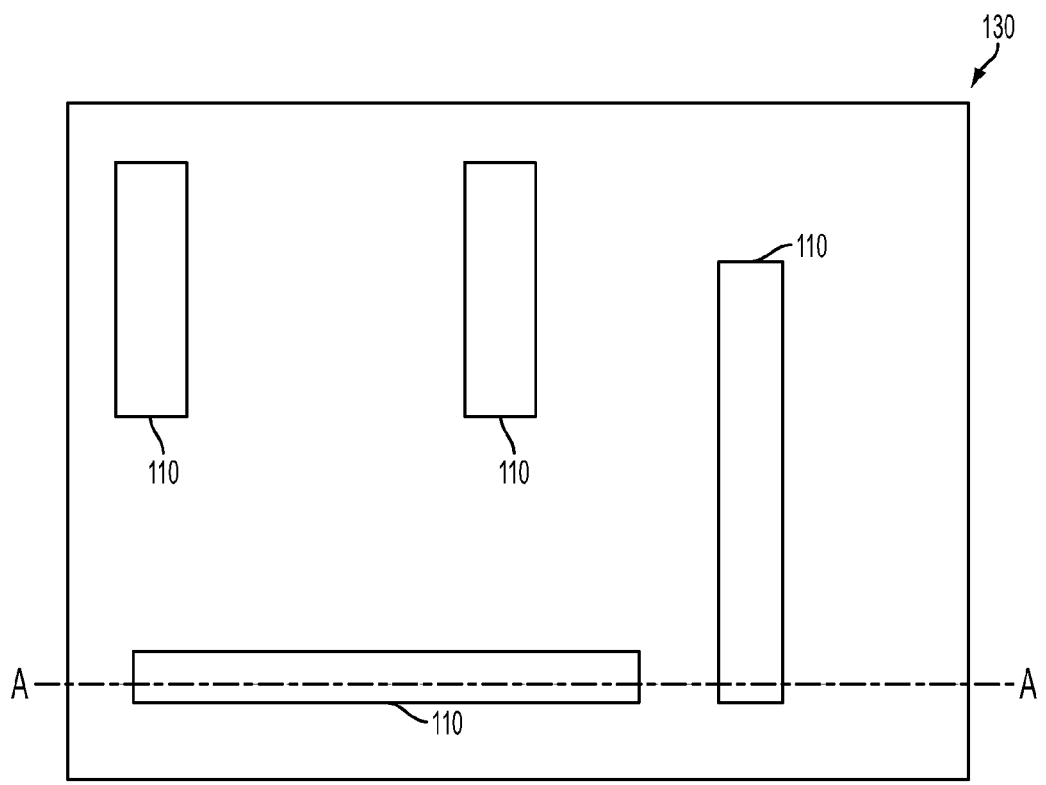
FIGS. 1B and 1C are individual masks based on the layout of FIG. 1A according to one or more embodiments.
Figure 1C:
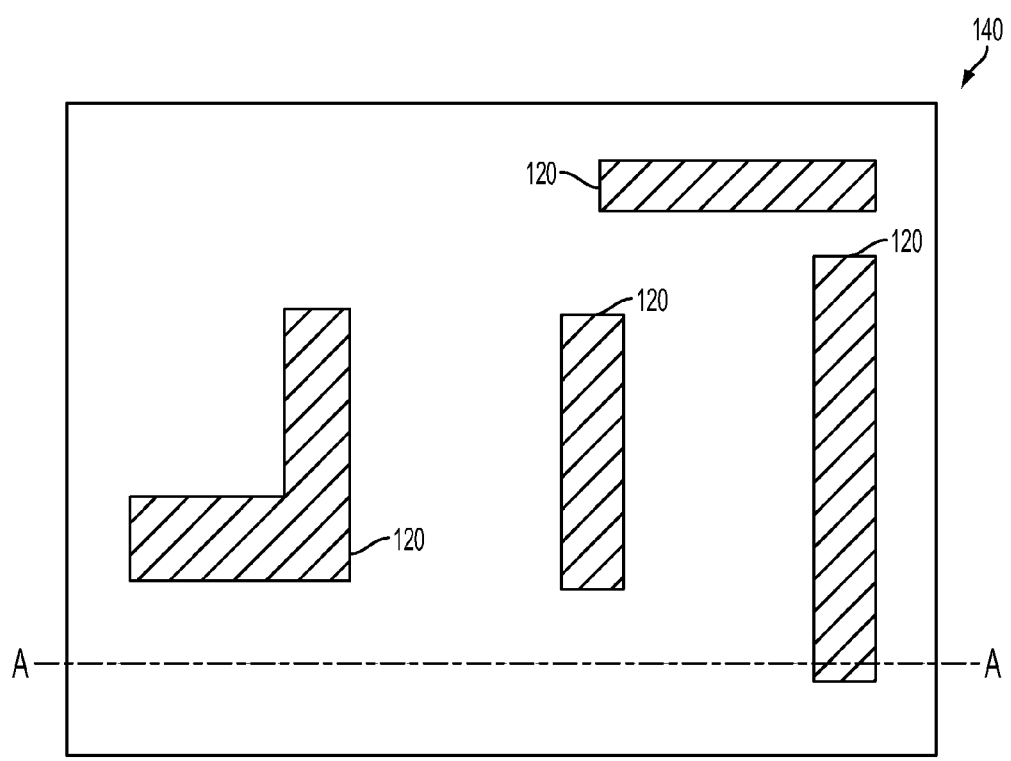

FIG. 1A is an overhead view of a layout 100 of one layer of an IC formed using MPT. There are two sets of features in layout 100. A first set of features 110 (also referred to as a first feature set) is formed with the use of a first mask 130 (FIG. 1B). A second set of features 120 (also referred to as a second feature set) is formed with a second mask 140 (FIG. 1C). Thus, the layout in FIG. 1A is an example of double patterning technology (DPT), because two masks are used in combination in close spatial relation. Layout 100 represents an intended pattern to be formed on a substrate. Dotted line A-A denotes a cross-section of layout 100 depicted in FIG. 1A.

One of the reasons DPT or MPT is utilized stems from distances between features. Referring to FIG. 1A, a first distance, $D_1$, is the distance between one feature of first feature set 110 and another feature of first feature set 110. A second distance, $D_2$, is the distance between one feature of first feature set 110 and one feature of second feature set 120. $D_1$ is greater than $D_2$. Due to uncorrectable resolution issues, features formed by a single mask are separated by a minimum distance to reduce the likelihood of short circuits created by features overlapping one another. Therefore, $D_1$ is equal to or greater than the minimum distance between openings on a single mask. Put another way, $D_1$ is equal to or greater than the smallest pattern that can be fabricated on a single mask. However, $D_2$ can be smaller than the smallest pattern of a single mask, because the features are formed by processes employing separate masks.

In some embodiments, first feature set 110 and second feature set 120 include features used in active circuitry or features in spare cells. In some embodiments, first feature set 110 and second feature set 120 include features used in active circuitry and features in spare cells. The features in spare cells are available to implement modifications of the IC. Active circuitry are those features that are electrically coupled or connected to other features in the IC, while spare cells are typically not connected to other features prior to modification of the IC.

FIGS. 1B and 1C depict individual masks whose features make up the layout of FIG. 1A. FIG. 1B shows a first mask 130 having first feature set 110 as depicted in FIG. 1A. FIG. 1C shows a second mask 140 having second feature set 120 as depicted in FIG. 1A. The combination of first feature set 110 of first mask 130 and second feature set 120 of second mask 140, using MPT, results in layout 100 of FIG. 1A.

Thus, when making modifications to layout 100, several factors are taken into account. Other than factors affecting the operation of the IC, such as locations of circuit elements, one such factor is the minimum distance between features formable by a single mask. If an ECO requests that a feature be placed too close to an adjacent feature formed by the same mask, a conflict arises and the feature is formed by a subsequent mask. Modifications resulting in the use of additional masks increase production costs and the complexity of design modifications.

Figure 2A:
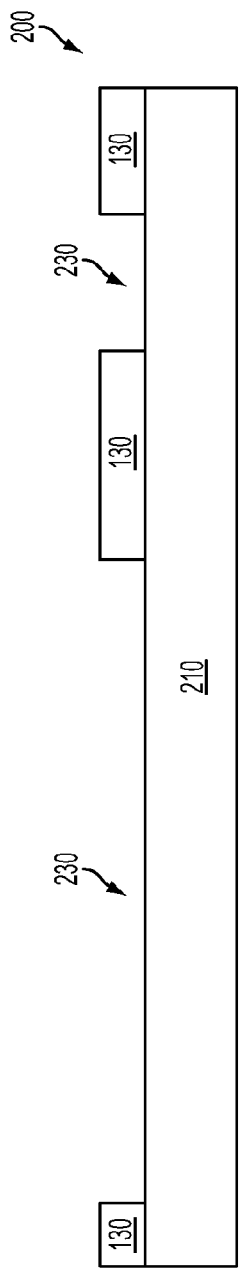
FIGS. 2A-2C are cross-sectional views of features that are formed during a manufacturing process according to one or more embodiments.
Figure 2B:
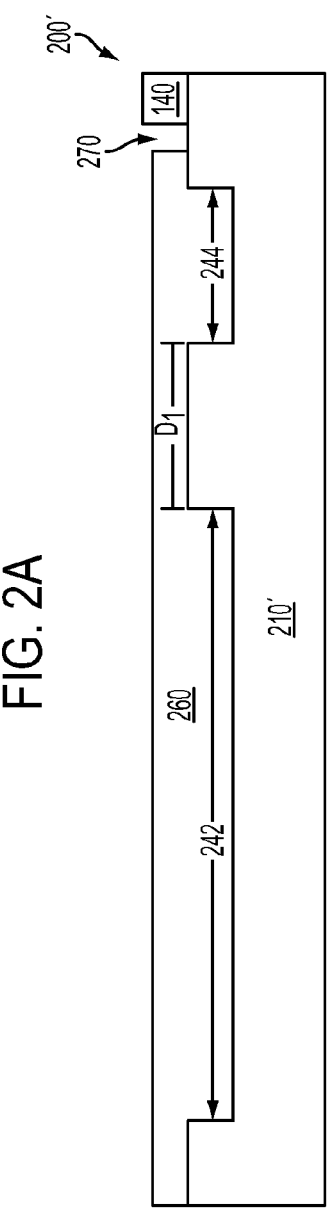
Figure 2C:
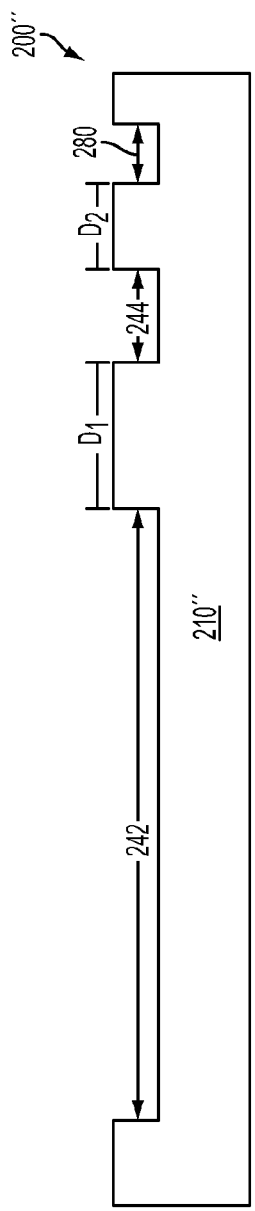

FIGS. 2A-2C depict cross-sectional views of features that are formed during a manufacturing process. FIG. 2A depicts a partial IC 200 which is patterned consistent with layout 100 as seen along line A-A. Partial IC 200 includes a substrate 210. First mask 130 is over substrate 210. First mask 130 has openings 230 corresponding to first feature set 110. Fabrication processes (e.g., etching, photolithography, and/or deposition processes) are able to be performed to transfer the pattern of first feature set 110 to substrate 210.

FIG. 2B shows a partial IC 200', which has undergone one or more fabrication processes to remove portions of substrate 210. Partial IC 200' includes substrate 210' which includes features 242 and 244. Features 242 and 244 are separated by distance, $D_1$. In some embodiments, distance, $D_1$, is equal to the minimum spacing between features on a single mask. In some embodiments, distance, $D_1$, is greater than the minimum spacing between features on a single mask. Features 242 and 244 are depicted as recesses or trenches in substrate 210'. Features 242 and 244 correspond with first feature set 110 in FIG. 1A. Features 242 and 244 should not be construed as limited to trenches, as first mask 130 is alternatively usable in a process to deposit a material and form a patterned layer above substrate 210.

Second mask 140 is over partial IC 200'. Second mask 140 has an opening 270 corresponding to second feature set 120. Fabrication processes (e.g., etching, photolithography, and/or deposition processes) are able to be performed to transfer the pattern of second feature set 120 to substrate 210'. In some embodiments, the fabrication process used to transfer the pattern of second feature set 120 to substrate 210' is substantially the same as the fabrication process used to transfer the pattern of first feature set 110 to substrate 210. In some embodiments, the fabrication process used to transfer the pattern of second feature set 120 to substrate 210' is different than the fabrication process used to transfer the pattern of first feature set 110 to substrate 210.

FIG. 2C shows a partial IC 200", which has undergone one or more fabrication processes to remove portions of substrate 210'. Partial IC 200" includes substrate 210", features 242 and 244, and a feature 280. Feature 280 corresponds to second feature set 120. Thus, IC 200" includes patterns corresponding to first feature set 110 and second feature set 120 of layout 100. Feature 280 is separated from feature 244 by distance, $D_2$. In some embodiments, distance, $D_2$, is less than the minimum spacing between features on a single mask.

Again, it should be noted that the present disclosure is not limited to trenches, as first feature set 110 and second feature set 120 are formable by similar or different films on substrate 210 in order to form partial IC 210".

Figure 3:
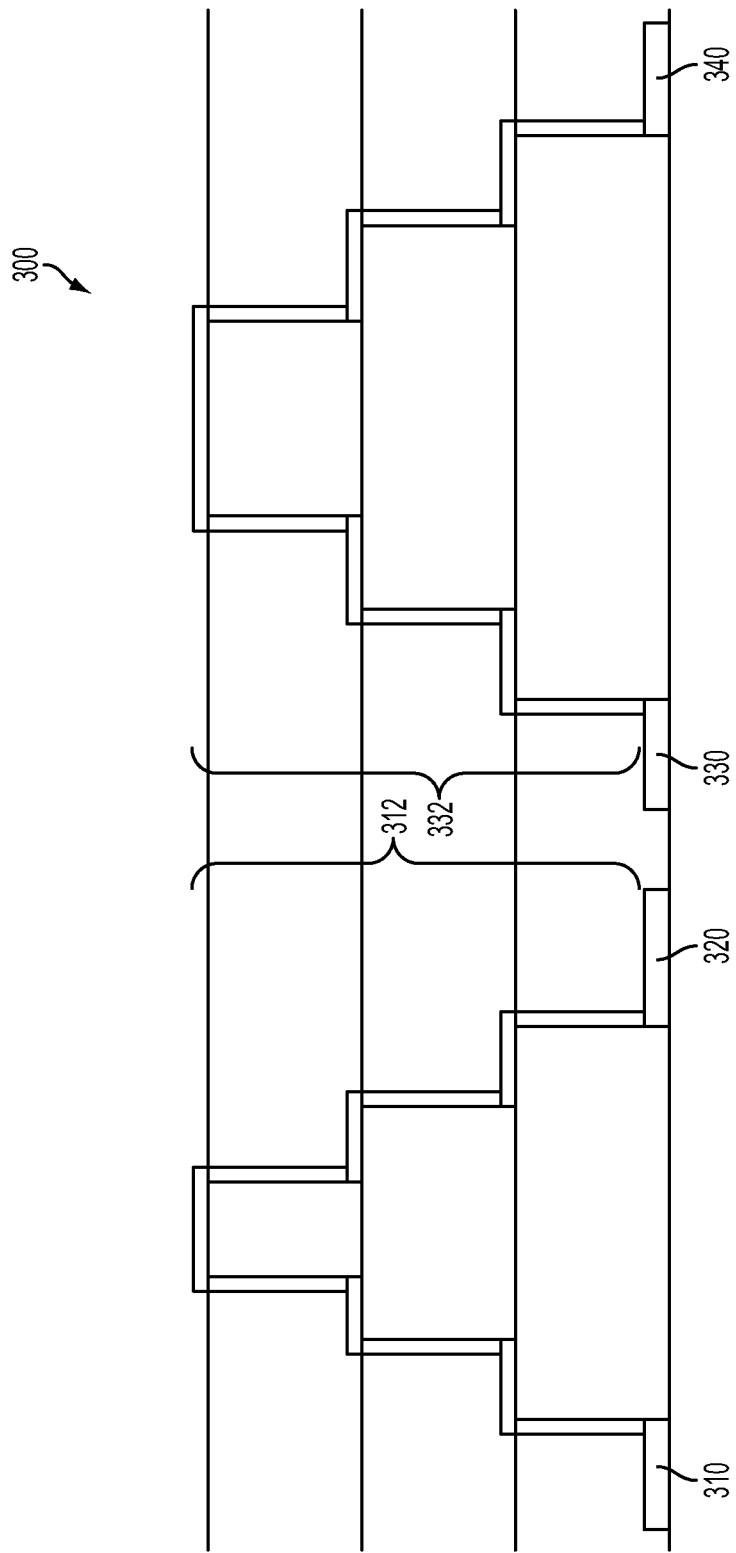
FIG. 3 is a cross-sectional diagram of an integrated circuit (IC) reconfigurable using an MPT layer according to one or more embodiments.

FIG. 3 is a cross-sectional diagram of an IC 300 usable to reconfigure an MPT layer according to an embodiment. In spare cell layout 300, spare cells are grouped according to the mask used to form corresponding features. IC 300 includes a first active cell 310 configured to connect to a first spare cell 320 by an interconnect structure 312. IC 300 further includes a second active cell 330 configured to connect to a second spare cell 340 by an interconnect structure 332. Interconnect structures 312 and 332 include metal conducting layers, which are formable of metals such as aluminum, copper, gold, silver, tantalum, titanium, alloys, or other suitable conductive materials.

First active cell 310 and second active cell 330 are part of a first group of features formed using a first mask, such as first mask 130. First spare cell 320 and second spare cell 340 are part of a second group of features formed using a second mask, such as second mask 140. FIG. 3 depicts two spare cells 310 and 340. In some embodiments, IC 300 includes a single spare cell or more than two spare cells. If an ECO is received for modifying IC 300 a layout of connections for spare cell 310 or 340 is modified to connect to active cells 320 or 330, respectively. According to an embodiment, the modified spare cells 310 or 340 are selected from a group formable by the same mask so as to minimize a number of masks modified to comply with the ECO.

Spare cells 310 and 340 of IC 300 are formable by a given set of features on the same mask. In an example where layout 100 is used to form IC 300, a portion of spare cell 310 from first feature set 110 is modified to connect to a portion of active cell 320 from features in first feature set 110, so that only mask 130 is replaced with a new mask. In the alternative, if a portion of spare cell 340 from second feature set 120 is modified to connect to a portion of active cell 340 from features in second feature set 120, so that only mask 140 is replaced with a new mask.

In some embodiments, the groupings and selections of active and spare cells are predetermined prior to designing a layout, such as layout 100, or prior to receiving an ECO. In other embodiments, the grouping and modifications are dependent on the changes requested. While only two sets of features and spare cells are shown in FIG. 3, more than two groups are possible such that multiple groups are available for one mask. For example, there may be three groups of spare cells formable by a first mask and three groups of spare cells formable by a second mask. To further the example, changes to the layout are possible by selecting spare cells in a first and a second group, which are both formable using a first mask. A third group, also formed with the first mask, may not be necessary for the modification, while the groups formed by a second mask remain unchanged.

Figure 4:
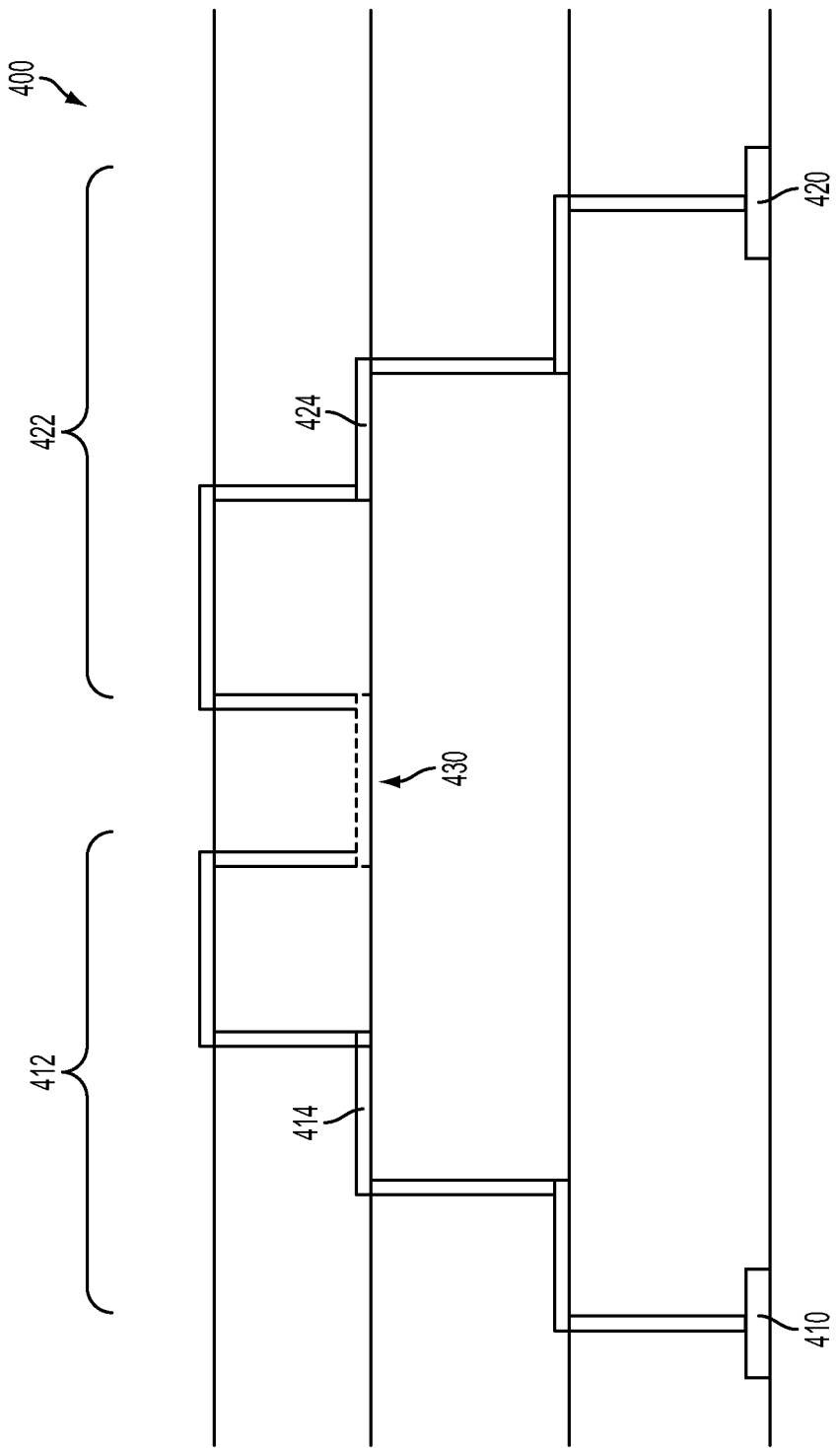
FIG. 4 is a cross-sectional diagram of an IC reconfigurable using an MPT layer according to one or more embodiments.

FIG. 4 depicts an IC 400 which is reconfigurable by a modification to an MPT layer. In IC 400, and unlike the embodiment in IC 300, the spare cells are not grouped, but are re-routed according to a mask used to form connections. In IC 400, a first cell 410 is connected to layers above the first cell by an interconnect structure 412. A second cell 420 is connected to layers above the second cell by an interconnect structure 422. An optional connection 430 connects the two interconnect structures 412 and 422.

A portion of interconnect structure 412 is marked as portion 414 and is formable by a first mask, such as first mask 130. A portion of interconnect structure 422 is marked as portion 424 and is formable by a second mask, such as second mask 140. In some embodiments, the spacing between portion 414 and connection 430 is greater than or equal to the minimum spacing between features on a single mask. In some embodiments, a distance between portion 424 and connection 430 is greater than or equal to the minimum spacing between features on a single mask. In an embodiment, wherein an ECO is able to be completed by re-routing second cell 420 so that second cell 420 is connected to first cell 410 by connection 430 and the distance between connection 430 and at least one of portions 414 or 424 is greater than or equal to the minimum spacing between features on a single mask the ECO is able to be completed by replacing only one mask.

The given embodiment is usable if the spare cells are routed to a level suitable to connect any structure within the layout, here shown as the level below the uppermost level. Therefore, while portions 414 and 424 are formable by different masks, connection 430 is formable by either a mask used in the processes to form interconnect structure 412 or a mask used in the processes to form interconnect structure 422.

Connection 430 is a metal conducting layer, which is formed of metals such as aluminum, copper, gold, silver, tantalum, titanium, alloys, or other suitable conductive materials. Connection 430, as well as interconnect structures 412 and 422, is formable by suitable processes, such as physical vapor deposition (PVD), sputtering, electroplating, electroless plating, or the like.

Figure 5:
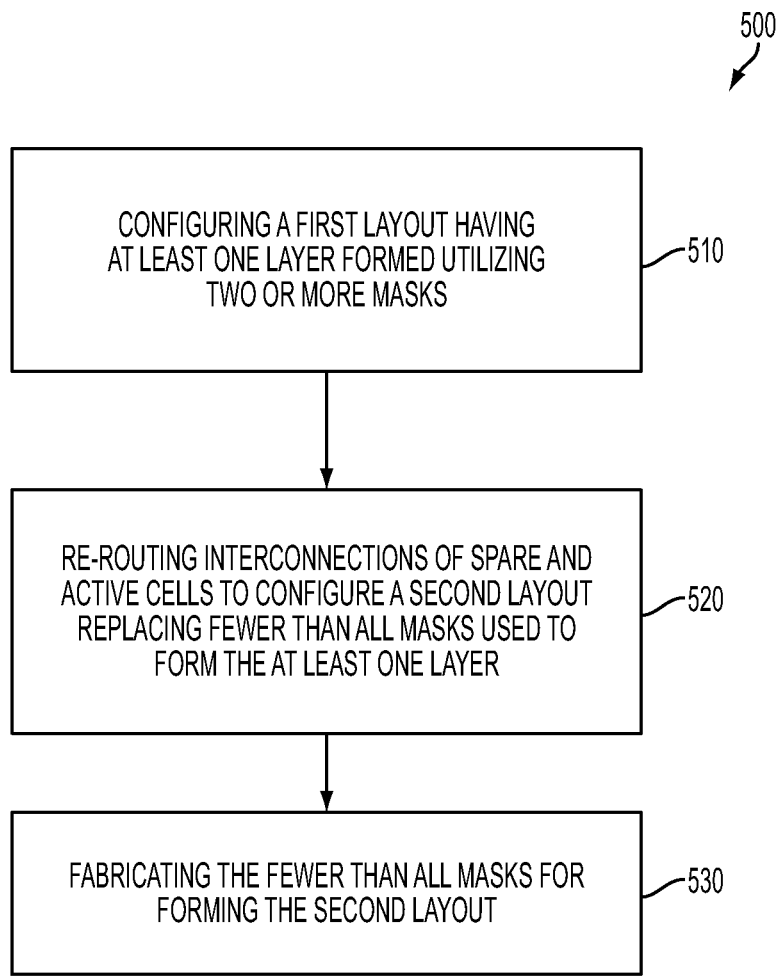
FIG. 5 is a flow chart of a method of modifying an IC design according to one or more embodiments.

FIG. 5 depicts a process flow diagram of a method 500 of modifying an IC design according to one or more embodiments. At a step 510, a first layout is configured. The IC formable by the first layout includes at least one layer having features formable by multiple masks. The at least one layer has active features and spare cells.

At a step 520, at least one spare cell is re-routed in the at least one layer. In some embodiments, the spare cells of the least one layer are grouped according to the mask used to form the features. In the alternative, a single group of spare cells is used and the connections are re-routed by a single mask. The re-routing utilizes fewer than all of the multiple masks of the first layout, such that fewer than all the masks are replaced to form a second layout (i.e., at least one mask fabricated for the first layout is usable for the second layout).

At a step 530, the fewer than all of the multiple masks are fabricated. Therefore, if two masks were used to form the layer in the first layout, only one mask must be replaced with a new mask to produce the second layout. If three or more masks are used to form the layer in the first layout, one or two new masks will be fabricated, and two or one masks will be reused.

A method of modifying an integrated circuit (IC) design that utilizes multiple patterning technology (MPT) is disclosed. The method includes configuring a first layout of an integrated circuit, having at least one layer with features to be formed utilizing fabrication by at least two masks. The at least one layer includes a plurality of active cells configured to be utilized in the circuit and a plurality of spare cells configured not to be utilized in the circuit. The spare cells and active cells are re-routed to configure a second layout, wherein the re-routing utilizes at least a portion of the spare cells. Fewer than all of the at least two masks are replaced in order to produce the second layout.

Also disclosed is another method of modifying an integrated circuit (IC) design that is designed utilizing MPT. The method includes providing a first layout of an integrated circuit having at least one layer with features formed utilizing at least two masks. The at least one layer includes a plurality of active cells utilized in the circuit and a plurality of spare cells not utilized in the circuit. The spare cells are grouped into at least two groups of spare cells. The first layout is modified to produce a second layout such that fewer than all masks for forming the at least one layer are replaced. The second layout utilizes only spare cells from one group.

Another method of implementing modifications to integrated circuit designs that are designed utilizing MPT is disclosed. The method includes providing a first layout of an integrated circuit having at least one layer with features formed utilizing at least two masks. The at least one layer includes a plurality of active cells utilized in the circuit and a plurality of spare cells not utilized in the circuit. Interconnect structures of spare cells are routed to a common layer. The first layout is modified to produce a second layout. The second layout utilizes at least a portion of the spare cells. Fewer than all masks utilized in the first layout are replaced in order to produce the second layout.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of modifying an integrated circuit (IC) design that utilizes multiple patterning technology (MPT), the method comprising:
   configuring a first layout of the IC, wherein the IC is configured to have at least one layer with features formed utilizing fabrication by at least two masks, and wherein the at least one layer includes a plurality of active cells and a plurality of spare cell;
   configuring a second layout, wherein configuring the second layout comprises re-routing the plurality of spare cells and plurality of active cells, the re-routing utilizes at least one of the plurality of spare cells, and fewer than all of the at least two masks are replaced to configure the second layout; and
   fabricating the fewer than all of the at least two masks that are replaced.

2. The method of claim 1, wherein the re-routing the plurality of spare cells and plurality of active cells further comprises dividing the plurality of spare cells into at least two groups of spare cells.

3. The method of claim 2, wherein the at least two groups of spare cells are divided based on the at least two masks fabricated to form the features, such that a first group includes features formed utilizing at least a first mask and a second group includes features formed utilizing at least a second mask.

4. The method of claim 3, wherein a distance from at least one feature in the first group to at least one feature in the second group is less than a minimum distance achievable through fabrication of, and formation with, a single mask.

5. The method of claim 3, wherein the at least two groups are predetermined prior to configuring the second layout.

6. The method of claim 1, wherein the re-routing the plurality of spare cells and plurality of active cells further comprises routing interconnect structures of spare cells to a common layer.

7. The method of claim 6, wherein the fewer than all masks that are replaced to configure the second layout is one or more masks used to form structures of the common layer.

8. The method of claim 7, wherein the common layer is a metal conducting layer.

9. The method of claim 8, wherein the metal conducting layer comprises aluminum, copper, gold, silver, tantalum, titanium, or combinations thereof.

10. The method of claim 1, further comprising transferring a pattern of the fewer than all of the at least two masks to an integrated circuit (IC).

11. A method of modifying an integrated circuit (IC) design that utilizes multiple patterning technology (MPT), the method comprising:
    configuring a first layout of the IC having at least one layer with features formed utilizing fabrication of at least two masks, wherein the at least one layer includes a plurality of active cells and a plurality of spare cells;
    grouping the plurality of spare cells into at least two groups of spare cells;
    modifying the first layout to produce a second layout, wherein the second layout utilizes only spare cells from one group such that fewer than all masks for forming the at least one layer are replaced; and
    fabricating the fewer than all masks for forming the at least one layer.

12. The method of claim 11, wherein the grouping the plurality of spare cells into at least two groups of spare cells is based on the at least two masks fabricated to form the features, such that a first group is formed utilizing a first mask and a second group is grouped because it is formed utilizing a second mask.

13. The method of claim 12, wherein at least one feature in the first group is closer to at least one feature in the second group than achievable with a single mask.

14. The method of claim 12, wherein the at least two groups are predetermined prior to modifying the first layout.

15. the method of claim 11, further comprising transferring a pattern of the fewer than all of the mask to an integrated circuit (IC).

16. A method of modifying an integrated circuit (IC) design that utilizes multiple patterning technology (MPT), the method comprising:
    configuring a first layout of the IC having at least one layer with features formed utilizing fabrication of at least two masks, wherein the at least one layer includes a plurality of active cells and a plurality of spare cells;
    routing the interconnect structures of the plurality of spare cells in the IC to a common layer, such that connections can be modified by replacing fewer than all masks utilized for fabricating the layer;
    modifying the first layout to produce a second layout, wherein the second layout utilizes at least a portion of the plurality of spare cells, and wherein fewer than all masks utilized in the first layout are replaced to produce the second layout; and
    fabricating the fewer than all masks for forming the at least one layer.

17. The method of claim 16 further comprising fabricating the fewer than all masks for forming the at least one layer.

18. The method of claim 16, wherein the fewer than all masks utilized in the first layout that is replaced to produce the second layout are used to form the structures of the common layer.

19. The method of claim 16, wherein the common layer is a metal conducting layer.

20. The method of claim 19, wherein the metal conducting layer comprises aluminum, copper, gold, silver, tantalum, titanium, or combinations thereof.

\* \* \* \* \*